Figure 1:
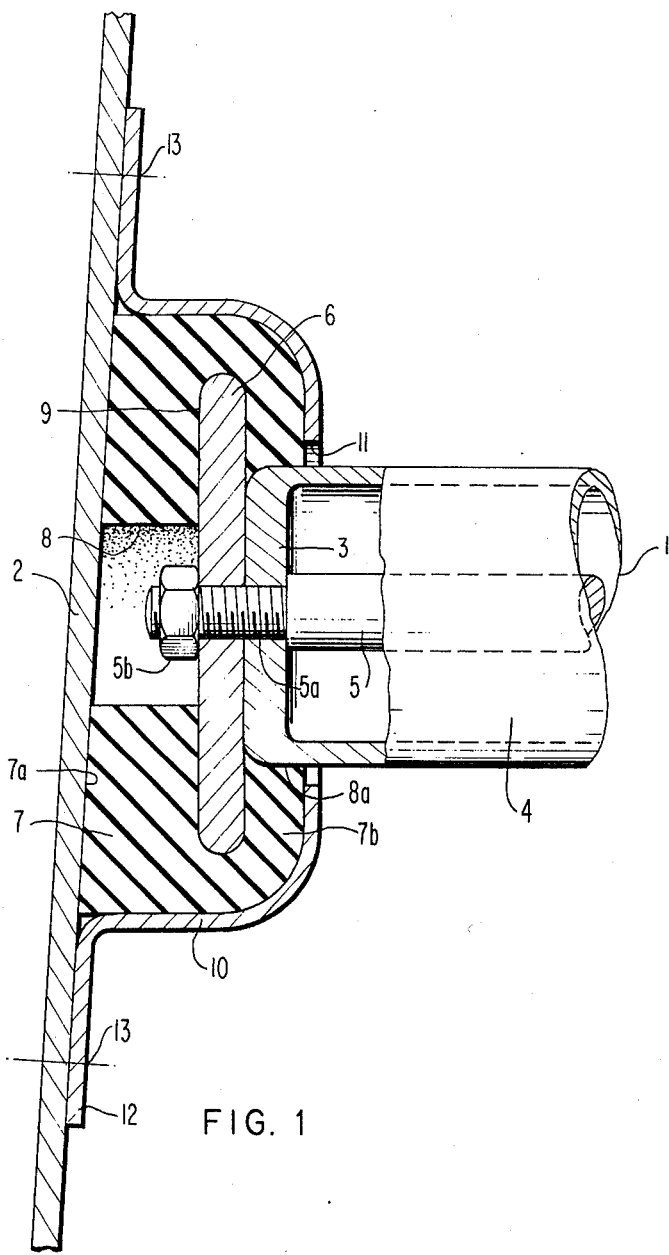

United States Patent [19]
Häberle et al.

[11] 3,989,293
[45] Nov. 2, 1976

[54] SHOCK ABSORBER MOUNTING IN MOTOR VEHICLES

[75] Inventors: Fritz Häberle, Sindelfingen; Daniel Riechers, Calw-Heumaden, both of Germany

[73] Assignee: Daimler-Benz Aktiengesellschaft, Germany

[22] Filed: Sept. 16, 1974

[21] Appl. No.: 506,336

[30] Foreign Application Priority Data
Sept. 19, 1973 Germany.............................. 2347075

[52] U.S. Cl................................. 293/88; 188/321; 248/18; 248/358 R; 267/140; 293/99; 403/226

[51] Int. Cl.².......................................... B60R 19/06

[58] Field of Search ............ 188/321; 267/139, 140; 248/15, 18, 22, 358 R; 403/226; 293/88, 99

[56] References Cited
UNITED STATES PATENTS

| | | | |
|---|---|---|---|
| 1,754,308 | 4/1930 | Cowell et al........................... | 248/22 |
| 2,538,658 | 1/1951 | Saurer.................................... | 248/22 |
| 3,669,389 | 6/1972 | Goto............................... | 403/226 X |
| 3,715,139 | 2/1973 | Tuggle .............................. | 267/140 X |
| 3,741,560 | 6/1973 | Schaller........................... | 267/140 X |

FOREIGN PATENTS OR APPLICATIONS

| | | | |
|---|---|---|---|
| 479,024 | 11/1951 | Canada................................. | 248/15 |

*Primary Examiner*—George E. A. Halvosa
*Attorney, Agent, or Firm*—Craig & Antonelli

[57] ABSTRACT

A shock absorber fastening at the bumper of motor vehicles, in which an impact plate is secured externally at the bottom of the shock absorber housing which projects considerably beyond the circumference of the shock absorber housing bottom; the impact plate is embedded within a shock absorber bearing of an elastomer or polyurethane material; the impact plate is detachably secured at the bumper by way of a metal cap at least partly surrounding the shock absorber bearing, through which a shock absorber housing part is adapted to be extended.

8 Claims, 2 Drawing Figures

SHOCK ABSORBER MOUNTING IN MOTOR VEHICLES

The present invention relates to the shock absorber fastening at bumpers of motor vehicles. In present-day motor vehicles, the forces exerted on the bumpers during impact shocks are not introduced directly into the frames but in the interest of their damage-free absorption, are absorbed by a shock absorber supported at the vehicle frame. The connection of the shock absorber with the bumper should be as simple as also as inexpensive and appropriate as possible.

As a solution to the underlying problems, the present invention provides that the cylindrical shock absorber housing is overlapped considerably in the circumference by a baffle or impact plate externally secured at its bottom, that the impact plate is embedded in a shock absorber bearing of an elastomer material and that the impact plate is detachably secured on the bumper by means of a metal cap partly enclosing the bearing which is adapted to be traversed by a shock absorber housing part.

Advantageously, the impact plate is disposed approximately in the center of the shock absorber bearing. The impact plate consists of a metallic material. It may be threadably connected with the shock absorber by a shank projecting through the housing bottom.

The unitary construction of the impact plate together with the shock absorber at the bottom thereof represents a further advantageous construction of the present invention.

The shock absorber is appropriately fastened at the bumper of the motor vehicle under insertion of the shock absorber bearing, and more particularly by means of the metal cap. The latter encloses the bearing on the side of the shock absorber together with the bottom part thereof and is threadably secured with its edge onto the bumper.

The shock absorber bearing may be constituted both of an elastomer as also of a polyurethane foam with suitable spring force. It acts as damping member between the bumper frequently exposed to a hard impact shock and the shock absorber, properly speaking.

Accordingly, it is an object of the present invention to provide a shock absorber mounting in motor vehicles which avoids by simple means the aforementioned shortcomings and drawbacks encountered in the prior art.

Another object of the present invention resides in a fastening of a shock absorber at the bumper of a motor vehicle which is as simple as possible as also as inexpensive and appropriate as possible.

A further object of the present invention resides in a shock absorber fastening of the type described above in which the impact shocks are introduced from the bumper into the frame by way of a shock absorber which is detachably connected in a particularly appropriate manner with the bumper.

A still further object of the present invention resides in a shock absorber mounting in motor vehicles in which an elastic bearing is interposed between the bumper and the shock absorber, properly speaking.

Still another object of the present invention resides in a shock absorber mounting which is capable of absorbing a part of the impact, yet is simple in construction and easy to install.

Figure 2:
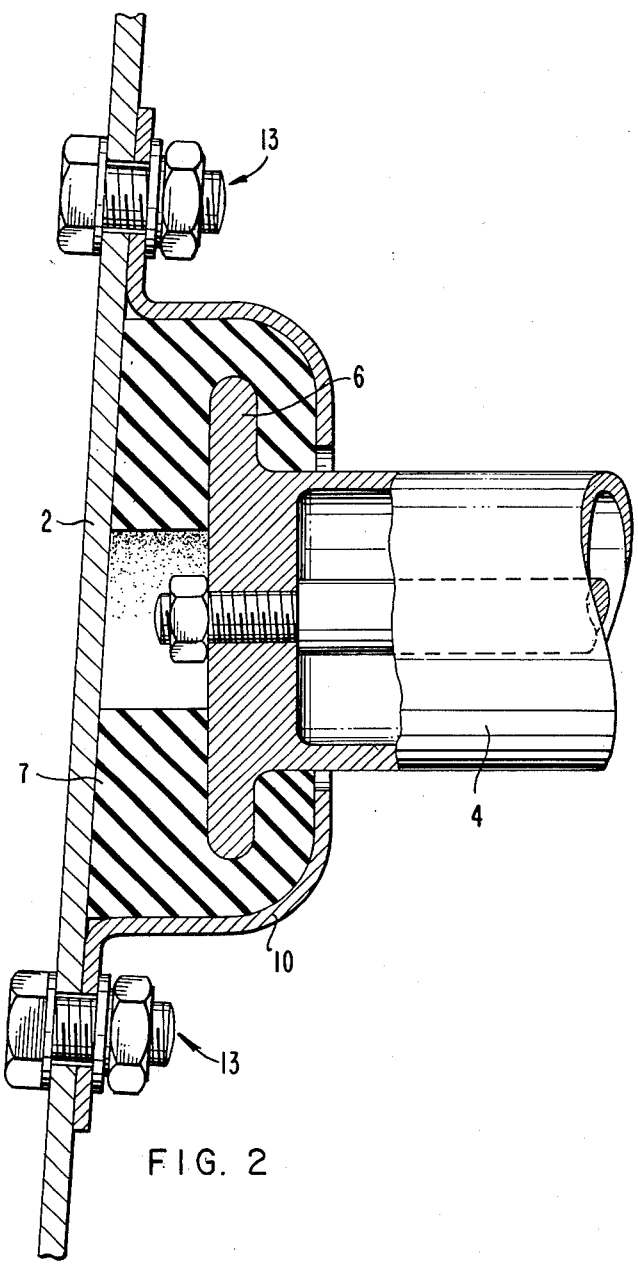

These and further objects, features and advantages of the present invention will become more apparent from the following description when taken in connection with the accompanying drawings which show, for purposes of illustration only, several embodiments in accordance with the present invention, and wherein:

FIG. 1 is an axial cross-sectional view through a shock-absorber fastening in accordance with the present invention; and FIG. 2 is an axial cross-sectional view of a further embodiment of the present invention.

Referring now to FIG. 1 which illustrates in cross section the fastening of a shock absorber at the associated bumper of a motor vehicle, the shock absorber 1 of any conventional construction is elastically connected with the bumper 2. For this purpose, a rod-shaped shank 5 which connects to the piston, not shown, projects from the bottom 3 of the cylindrical shock absorber housing 4 in the center of the bottom thereof. The shank 5 is provided at its free end with an external thread 5a. A baffle or impact plate 6 of metal is threadably fastened on the shank 5. The metal plate 6 is embedded in an elastic shock absorber bearing 7 to provide an absorbing member for any force or load which impinges against the bumper 2; depending on the material of the shock absorber bearing 7 which preferably consists of an elastomer of conventional type but may also consist of polyurethane foam, the metal plate 6 is either formed-in during the manufacture of the shock absorber bearing 7 or is vulcanized-in.

The shock absorber bearing 7 is constructed as a hollow body with a bottom 7a that is similarly bevelled off or inclined corresponding to the more or less oblique configuration of the bumper on which the shock absorber bearing 7 rests. The bore 8 in the bearing center serves for the fastening of the impact plate 6 at the shock absorber housing 4 by means of the nut 5b. The impact plate 6 is formed-in within the shock absorber bearing 7 approximately in the center thereof; a corresponding groove 9 thereby results in the shock absorber bearing 7. The bore 8 is enlarged on the other side of the impact plate 6 into a bore 8a with the diameter of the shock absorber housing 4; the bottom portion 3 of the shock absorber housing 4 is enclosed thereat by the shock absorber bearing 7.

For purposes of connecting the shock absorber bearing 7 and of the shock absorber housing 4 resting therein with the bumper 2, the shock absorber bearing 7 is enclosed by a metal cap 10 which surrounds the same on all sides, except at the bottom 7a. Possibly one may also dispense with the upper and lower enclosure by the metal cap 10. The cap 10 is provided with a wide opening 11 in the center for the free passage of the shock absorber housing 4. The wide edge 12 of the cap 10 is threadably secured at the bumper 2 by means of bolts 13, as illustrated in FIG. 2. An impact on the bumper 2 is introduced into the shock absorber 1 by way of the impact plate 6, weakened by the shock absorber bearing 7.

For purposes of establishing the connection between the shock absorber housing 4 and the bumper 2, the cap 10 is placed over the shock absorber bearing 7 whereby the shank 5 of the shock absorber 1 extends centrally through the impact plate 6 and is tightened on the same by the nut 5b. Finally, the cap 10 is threadably secured on the bumper 2 along its flange-shaped edge 12. During the compressing of the shock absorber bearing 7 as a result of a hard impact, the shock absorber housing 4 can slide through the cap 10.

In a further arrangement, as illustrated in FIG. 2, the impact plate 6 and the shock absorber housing 4 may be constructed in one piece.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A shock absorber fastening at a vehicle bumper comprising a cylindrical shock absorber housing; an impact plate externally fixed to an end of said shock absorber housing, said impact plate having a diameter substantially larger than the diameter of said cylindrical housing; a metal cap member detachably secured to a vehicle bumper, said metal cap member having an aperture through which said end of said shock absorber housing extends; and an elastic shock absorbing bearing material contained in said metal cap member for embedding said end of said shock absorber housing and said impact plate within said metal cap member such that said end of said shock absorber housing and said impact plate are both elastically supported by said elastic shock absorbing bearing material, wherein said elastic shock absorbing bearing material is configured to bear against the bumper at a portion apart from said shock absorber housing to absorb direct impacts on said bumper and to transmit said impacts to said impact plate.

2. A shock absorber fastening according to claim 1, wherein said elastic shock absorbing bearing material includes one of an elastomer or polyurethane foam.

3. A shock absorber fastening according to claim 1, wherein said impact plate is supported approximately in the center of the shock absorbing bearing material.

4. A shock absorber fastening according to claim 3, wherein said impact plate consists of metallic material.

5. A shock absorber fastening according to claim 4, wherein said shock absorber housing and said impact plate are constructed in one piece.

6. A shock absorber fastening according to claim 3, wherein said shock absorbing bearing material seats said shock absorber housing within said metal cap member, and wherein said metal cap member is threadably secured at the bumper along its edge.

7. A shock absorber fastening according to claim 1, wherein said shock absorber housing and said impact plate are constructed in one piece.

8. A shock absorber fastening according to claim 1, wherein said shock absorbing bearing material seats said shock absorber housing within said metal cap member, and wherein said metal cap member is threadably secured at the bumper along its edge.

* * * * *